L. M. PAYNE, R. A. THOMPSON & L. P. MORRIS.
CHURN.
APPLICATION FILED SEPT. 13, 1917.
1,268,766.
Patented June 4, 1918.
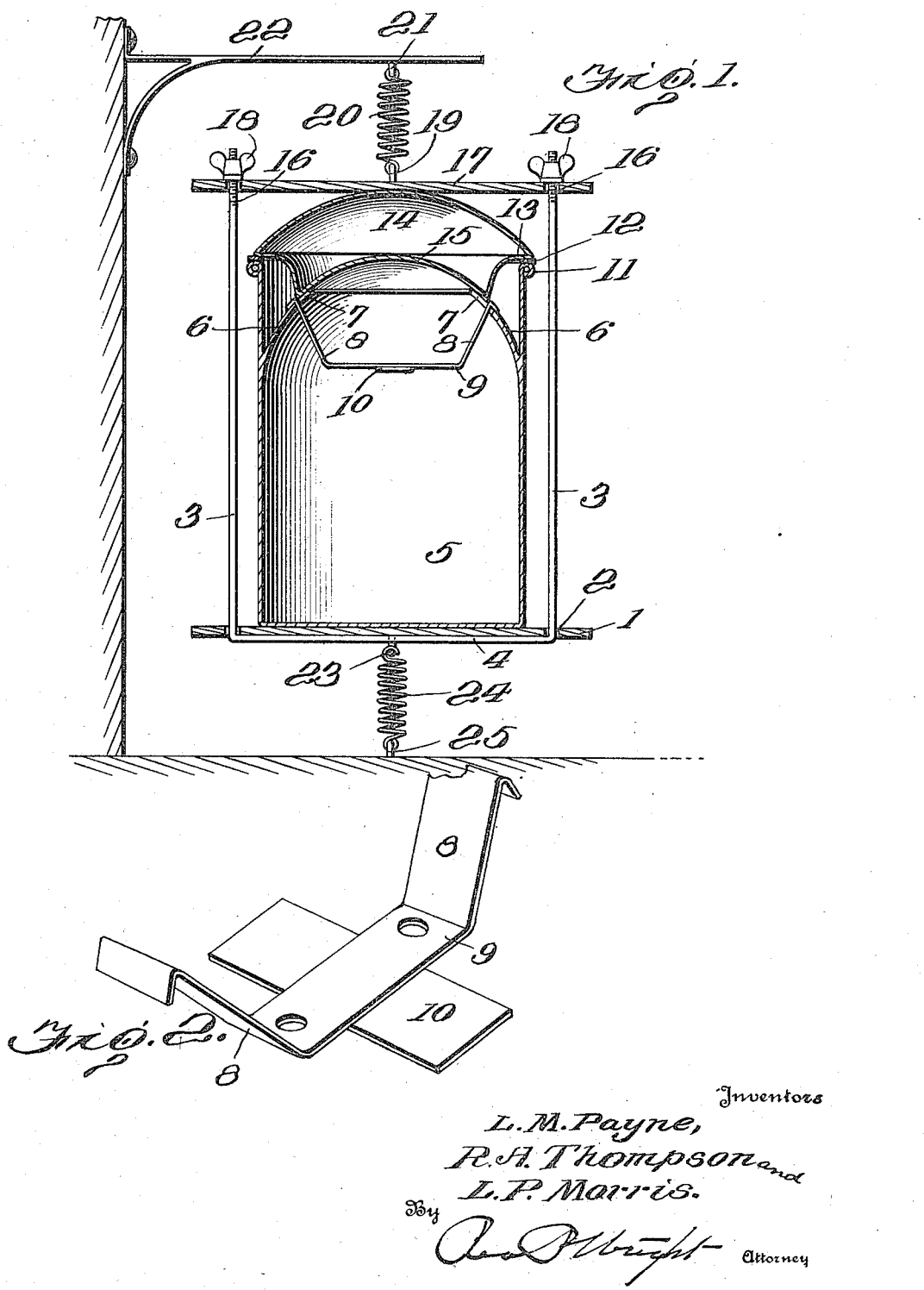

UNITED STATES PATENT OFFICE.

LUTHER MAXIE PAYNE, OF CAMPBELL, ROBERT ASBURY THOMPSON, OF DALLAS, AND LUTE PERCY MORRIS, OF CAMPBELL, TEXAS.

CHURN.

1,268,766.

Specification of Letters Patent.

Patented June 4, 1918.

Application filed September 13, 1917. Serial No. 191,233.

*To all whom it may concern:*

Be it known that we, LUTHER MAXIE PAYNE, ROBERT ASBURY THOMPSON, and LUTE PERCY MORRIS, citizens of the United States, residing at Campbell, Dallas, and Campbell, respectively, in the counties of Hunt, Dallas, and Hunt, respectively, and State of Texas, have invented certain new and useful Improvements in Churns, of which the following is a specification, reference being had therein to the accompanying drawing.

This invention relates to churns and more particularly to that class of churns known as working body-churns, the object being to provide a churn which is mounted between springs and is adapted to be worked up and down by the contraction and expansion of the springs so as to thoroughly agitate the cream within the receptacle thereof.

Another object of our invention is to provide a novel form of receptacle having a semi-spherical upper end formed by a concavo-convexed cap and an annular flange whereby the milk is thrown toward the center.

Another object of our invention is to form a novel form of dasher detachably mounted within the upper portion of the receptacle and held in position by the cap so that when the milk is thrown upwardly and centrally by the semi-spherical-shape of the upper portion of the can in falling will strike the dasher and agitate the cream in falling over the same.

Another and further object of our invention is to provide a churn which is exceedingly simple and cheap in construction and one in which the parts are so mounted that they can be readily separated in order to thoroughly clean the same.

Other and further objects and advantages of the invention will be hereinafter set forth and the novel features thereof defined by the appended claims.

In the drawings,

Figure 1 is a vertical section of our improved construction of churn partly in elevation; and Fig. 2 is a perspective view of the dasher detached.

Like numerals of reference refer to like parts in the several figures of the drawing.

In the drawing 1 indicates an oblong base having an aperture 2 adjacent each end through which extend the vertical arms 3 of the substantially U-shaped clamping member 4. Mounted on the base 1 is a receptacle 5 having adjacent its upper end an annular curved flange 6 which is provided with oppositely disposed slots 7 to receive the arms 8 of a dasher support 9, on which is transversely mounted a dasher 10. The dasher support 9 is provided with openings to each side of the dasher proper and this supporting portion in conjunction with the transversely arranged dasher 10 forms a dasher of such a shape that the cream is held in the upper portion of the receptacle as when the receptacle is agitated the cream is thrown upwardly and in falling passes over the dasher which has a tendency to hold the cream in the upper portion of the receptacle.

The upper end of the cylindrical receptacle 5 terminates in a bead 11 on which is mounted a gasket 12 adapted to be engaged by the flange portion 13 of a cover 14, said cover having a lining 15 which is concavo-convexed and in conjunction with the annularly curved flange 6 forms a substantially semi-spherical end portion for the receptacle so that the cream which is thrown upwardly will strike the curved flange and be carried centrally and in dropping will pass over the dasher.

The upper end of the arms 3 of the clamp 4 are threaded as shown at 16 and adapted to extend through apertures formed in a clamping bar 17 which engages the cover 14 as clearly shown in Fig. 1. The threaded ends 16 carry thumb screws 18 which engage the clamping bars 17 so as to clamp the receptacle securely between the base 1 and clamping bars 17.

When the cover is in position as shown in Fig. 2, the lining 15 thereof holds the arm 8 of the dasher support within the slots 7 of the flanges 6, and by this construction the dasher can be readily removed for cleaning when the cover has been removed from the receptacle.

Secured to the central portion of the clamping bar 17 is an eye 19 which is connected to the lower end of a coil spring 20, the upper end of which is connected to an eye 21 carried by a bracket 22 so as to support the churn by a coil spring in order to allow the same to move up and down.

The base 1 carries an eye 23 to which one end of a coil spring 24 is connected, the opposite end being connected to an eye 25 mounted in the floor, and by this construction the churn is mounted and supported between a pair of coil springs so that when the same is forced downwardly, the upper spring will be expanded, and when released the body will be worked up and down by the expansion and contraction of the spring. Any suitable means can be employed for giving the vertical movement to the churn and by this construction it is only necessary to operate the churn intermittently as after being once started the springs cause the body to reciprocate back and forth which thoroughly agitates the cream within the receptacle thereof.

We claim:

1. A churn, comprising a movably supported receptacle having an annular flange, a cover for closing said receptacle having a concavo-convexed lining engaging said flange forming a substantially semi-spherical portion, and a dasher mounted within the substantially semi-spherical portion of said receptacle.

2. In a churn, the combination with a receptacle having an annular inwardly extending curved flange provided with oppositely disposed slots, of a dasher support provided with arms having hooked ends mounted in said slots, a cover for closing said receptacle having a lining extending over the upper portion of said flange for holding the arms within said slots, and a dasher transversely mounted upon said dasher support.

3. A churn, comprising a cylindrical body having adjacent its upper end an annular inwardly projecting curved flange, a cover for closing said receptacle having a lining curved to correspond with the curvature of said flange and adapted to form in conjunction therewith a substantially semi-spherical upper end for said receptacle, and a dasher supported within said semi-spherical portion of said churn.

4. A churn, comprising a cylindrical receptacle having adjacent its upper end an interior annular curved flange provided with oppositely disposed slots, a dasher support having arms arranged within said slots, a dasher carried by said support, and a cover having a concavo-convexed lining extending over the upper portion of said flange forming a substantially semi-spherical shaped top for said receptacle, said lining forming a closure for said slots for retaining the arms of said dasher support therein.

In testimony whereof we hereunto affix our signatures in the presence of two witnesses.

LUTHER MAXIE PAYNE.
ROBERT ASBURY THOMPSON.
LUTE PERCY MORRIS.

Witnesses:
 RITA BOLADO,
 CHAS. T. HALTOM.

Copies of this patent may be obtained for five cents each, by addressing the "Commissioner of Patents. Washington, D. C."